Aug. 19, 1969     J. H. BREWSTER     3,461,598
WEIGHT FOR FISHING LINE

Filed March 27, 1967

INVENTOR
JOHN H. BREWSTER
BY Lothrop & West
ATTORNEYS

United States Patent Office 3,461,598
Patented Aug. 19, 1969

3,461,598
WEIGHT FOR FISHING LINE
John H. Brewster, 2227 Burney Way,
Sacramento, Calif. 95821
Filed Mar. 27, 1967, Ser. No. 626,127
Int. Cl. A01k 95/00
U.S. Cl. 43—44.97                                4 Claims

ABSTRACT OF THE DISCLOSURE

A fishing line weight having a core of two wires twisted together so as to anchor a plurality of radially extending bristles. A lead weight is mounted on the core intermediate the core ends, the maximum radial dimension of the weight being less than the length of the adjacent bristles.

---

The invention relates to improvements in bristle-supported weights for fishing lines.

One of the most common annoyances to a fisherman, particularly when fishing streams, oceans or lakes with rocky beds, is the loss of the weight attached to the line. By its very nature, the weight sinks to the bottom of the bed. Thus, when reeling in, the weight tends to drag along the bottom, and if rocks or other features are present on the bed, the weight all too frequently tends to become lodged in the rocks, leading to its loss as force continues to be applied to the line.

It is therefore an object of the invention to provide a fishing weight which substantially eliminates the loss heretofore resulting from catching and snagging weights on objects in the bed of a watercourse.

It is another object of the invention to provide a fishing weight which is relatively inexpensive, yet is rugged, durable and long-lived.

It is still another object of the invention to provide a fishing weight which can readily be dislodged, should it become caught, particularly where a current exists in the waterway.

It is a further object of the invention to provide a generally improved fishing weight.

Other objects, together with the foregoing, are attained in the embodiments described in the following description and shown in the accompanying drawing, in which.

While the fishing weight of the invention is susceptible of numerous physical embodiments, depending upon the environment and requirements of use, substantial numbers of the herein shown and described embodiments have been made, tested and used, and all have performed in an eminently satisfactory manner.

Figure 1:
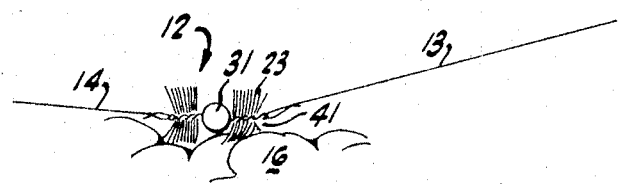
FIGURE 1 is a perspective view, to a reduced scale, illustrating the fishing weight in a typical, rocky stream bed environment.

The fishing weight of the invention, generally designated by the reference numeral 12 finds its greatest utility when used in conjunction with a fishing line 13. In some intstances the weight 12 is connected not only to the line 13, but also, as in FIGURE 1, to a leader 14 terminating, for example, in a baited fishing hook or lure (not shown).

In well-known manner, the fishing line, weight and baited hook, or lure, are periodically cast out into the water.

As the line is retrieved, the fishing weights heretofore used have evidenced a marked ability to "hang up" or become wedged in crevasses between objects, such as rocks 16, on the stream, ocean or lake bed. All too frequently, the force applied in endeavoring to dislodge the weight breaks the line, and the terminal tackle, including the weight, the leader and the hook, or lure, is lost.

Ordinarily, fishing weights are relatively small in size yet possess a high specific gravity and a low degree of resilience owing to the fact that they frequently are cast from lead. This combination of physical properties tends toward lodgment of the weight in small creavasses and between converging rock walls. The specific gravity causes the weight to sink quickly; the small size affords but little surface area against which a current of water can exert an aerodynamic dislodging force; and the low resilience of the lead material tends to cause the weight to drag along the bottom, when reeling in, rather than freely bouncing from rock to rock.

I have therefore provided a weight, preferably using lead to afford the desired mass, but have supported the weight at an elevated position so that it is rarely able to become wedged in an irretrievable location.

Although realizing that the axially elongated core 21, or matrix, could be formed from molded "plastic" in the shape of a rod, I prefer to utilize an endless wire stretched into an axial configuration and twisted to afford at its opposite ends a pair of loops 22, or eyes, for attachment to the fishing line 13, and leader 14, if used.

Prior to and concurrently with the twisting of the wire core, a plurality of bristles 23 is appropriately positioned relative to the wire so that at the conclusion of the wire twisting step, the bristles are radially flared outwardly from core 21.

The radial dimension of each of the bristles substantially exceeds the effective diameter of the core 21, and the outer ends of the bristles define an imaginary locus, or envelope 26, forming a surface of revolution with the longitudinal center of the core as an axis.

In the embodiments shown herein, the envelope 26 is, roughly, right circular cylindrical in configuration. However, other surfaces of revolution can also be utilized, such as ellipsoids or spheroids.

In some instances, the core 21 can itself be formed from material having a high specific gravity, in which event no other weight member is required.

Figure 2:
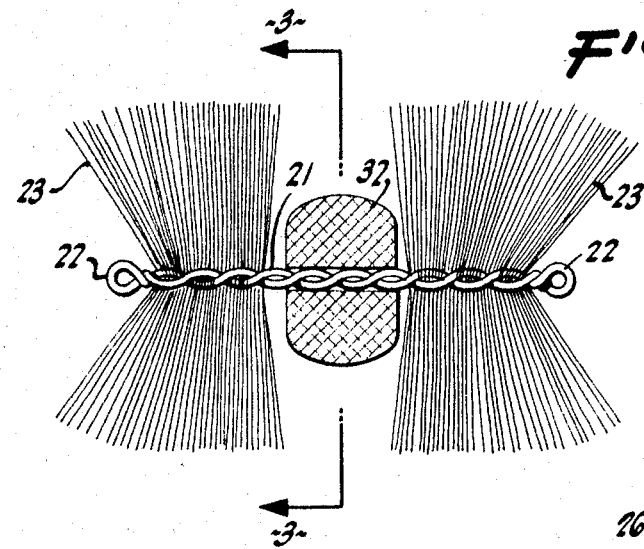
FIGURE 2 is a side elevational view of one form of the invention.
Figure 3:
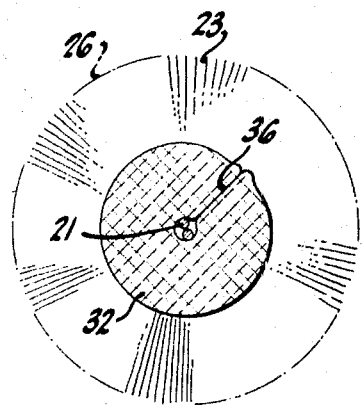
FIGURE 3 is a transverse sectional view, the plane of the section being indicated by the line 3—3 in FIGURE 2; and, FIGURE 4 is a side elevational view of a modified form of the device.
Figure 4:
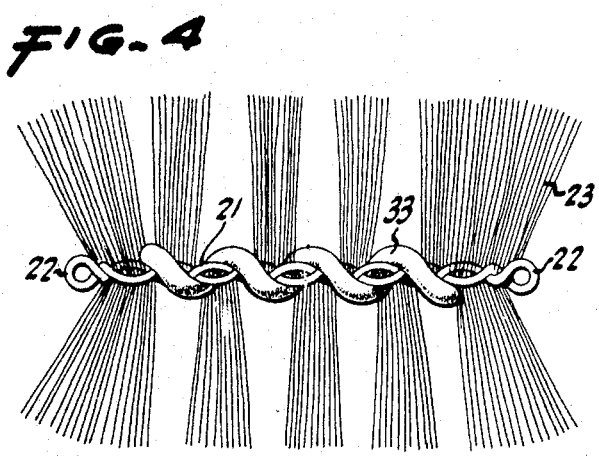

I prefer, however, to utilize for the core a tough wire, regardless of its specific gravity, and to add in symmetrical arrangement, either a substantially spherical weight member 31 (see FIGURE 1), or cylindrical weight member 32 (see FIGURES 2 and 3) or a helical (or sinuous) weight member 33 (see FIGURE 4).

In the case of a spherical or cylindrical weight member, the weight is preferably crimped on the wire core 21, in the manner of split shot, the abutting walls being indicated by the reference numeral 36 in FIGURE 3.

Where a helical weight member 33 is utilized, an elongated stick, or pencil, of lead is tightly wrapped around and along the twisted wire, as appears in FIGURE 4.

It is desirable to position the weight members on the core so that they are not only radially symmetrical, but are also centrally balanced. This centrally balanced arrangement enables the device to be oriented in either direction for attachment to the line and the leader, if used; and the radial symmetry tends to prevent the device from assuming a particular attitude.

With the weight member elevated and shielded by the bristles, as shown, the heavy weight member directly encounters external objects very rarely. Instead, the resilient, protective bristles cause the device to bounce from object to object as the fishing line is retrieved. Also, being resilient, the leading array 41, or grouping, of bristles (see FIGURE 1) readily yields as force is applied, and tends to spring out and elevate the entire device, thus avoiding catching and wedging.

Where the water includes a current, such as in a stream, or river, or in the ocean, the aerodynamic properties of the bristles afford still another advantage. If, for example, the line 13 were being retrieved in a right-hand, upstream direction (see FIGURE 1) and if the device were to become lodged in the rocks 16, it is frequently possible, by giving slack to the line, to disengage the weight from the rocks. In other words, the current moving in a left-hand direction, impinges on the bristles to a degree and tends to move the device toward the left and to free it from the encompassing rock walls. Ocean currents and water movement afford a comparable result.

It can therefore be seen that I have provided an efficient and reliable fishing line weight which is relatively compact in size yet which serves to eliminate the loss problems heretofore encountered with devices of this same general nature.

What is claimed is:

1. A fishing weight comprising:
    (a) an axially elongated core member including a loop mounted on at least one end of said core;
    (b) a plurality of substantially radial bristles mounted at one end on said core member, the outer ends of said bristles defining an envelope forming a surface of revolution; and,
    (c) a weight mounted on said core, said weight lying entirely within said envelope and being arranged in radial symmetry with respect to said core, said weight surrounding and being centrally balanced between the ends of said core, said bristles being substantially symmetrically arranged from end to end of said core and extending from sides of said core not covered by said weight.

2. The device of claim 1 wherein said weight is a substantially cylindrical lead mass.

3. The device of claim 1 wherein said weight comprises an elongated lead stick helically wound along said core.

4. A weight for a fishing line comprising:

(a) an elongate core having a loop on at least one end;
    (b) a weight mounted on said core intermediate the ends thereof, said weight having a predetermined maximum dimension in a radial direction, said weight having a predetermined mass; and
    (c) a plurality of bristles mounted on said core and extending radially outwardly, the outer ends of said bristles defining an imaginary envelope substantially forming a surface of revolution with said core as an axis, the radial extent of said bristles exceeding said predetermined maximum radial dimension of said weight and the stiffness of said bristles being capable of supporting said predetermined mass of said weight above a subjacent supporting surface, said weight being thereby deterred from snagging.

References Cited

UNITED STATES PATENTS

| | | | |
|---|---|---|---|
| 1,313,567 | 8/1919 | Ulrich | 43—42.4 X |
| 1,734,346 | 11/1929 | Reinhardt | 43—42.25 |
| 2,663,111 | 12/1953 | Hollingsworth | 43—42.4 |
| 1,849,899 | 3/1932 | Wright et al. | 43—42.25 |
| 2,043,609 | 6/1936 | Derry | 43—42.26 X |
| 2,165,734 | 7/1939 | Stracener | 43—42.27 |
| 2,223,475 | 12/1940 | Withey | 43—42.39 X |
| 2,544,796 | 3/1951 | Kreps | 43—42.39 X |
| 2,589,007 | 3/1952 | Landon | 43—42.39 X |
| 2,955,380 | 10/1960 | Hulick | 43—42.39 X |
| 3,035,368 | 5/1962 | Collins | 43—42.39 |
| 3,138,892 | 6/1964 | Hall | 43—42.25 |

FOREIGN PATENTS

| | | |
|---|---|---|
| 315,148 | 7/1929 | Great Britain. |
| 102,405 | 8/1963 | Norway. |
| 481,460 | 3/1952 | Canada. |

ALDRICH F. MEDBERY, Primary Examiner

U.S. Cl. X.R.

43—42.25, 42.26, 42.39